(12) United States Patent
Shin et al.

(10) Patent No.: US 11,350,074 B2
(45) Date of Patent: May 31, 2022

(54) METHOD FOR PROCESSING IMMERSIVE VIDEO AND METHOD FOR PRODUCING IMMERSIVE VIDEO

(71) Applicant: ELECTRONICS AND TELECOMMUNICATIONS RESEARCH INSTITUTE, Daejeon (KR)

(72) Inventors: Hong Chang Shin, Daejeon (KR); Gwang Soon Lee, Daejeon (KR); Sang Woon Kwak, Daejeon (KR); Kug Jin Yun, Daejeon (KR); Jun Young Jeong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 49 days.

(21) Appl. No.: 16/824,951

(22) Filed: Mar. 20, 2020

(65) Prior Publication Data

US 2020/0359000 A1  Nov. 12, 2020

(30) Foreign Application Priority Data

Mar. 20, 2019 (KR) .......................... 10-2019-0031685
Mar. 21, 2019 (KR) .......................... 10-2019-0032271
Mar. 20, 2020 (KR) .......................... 10-2020-0034454

(51) Int. Cl.
*H04N 13/161* (2018.01)
*H04N 13/156* (2018.01)
*H04N 13/178* (2018.01)

(52) U.S. Cl.
CPC ......... *H04N 13/161* (2018.05); *H04N 13/156* (2018.05); *H04N 13/178* (2018.05)

(58) Field of Classification Search
CPC .............. H04N 13/161; H04N 13/156; H04N 13/178; G06T 3/4038
See application file for complete search history.

(56) References Cited

U.S. PATENT DOCUMENTS

| | | | | |
|---|---|---|---|---|
| 2013/0021428 A1* | 1/2013 | Byers | .................... | G06F 3/1446 348/14.07 |
| 2014/0177706 A1* | 6/2014 | Fernandes | ............. | G06T 3/4053 375/240.03 |
| 2014/0307783 A1* | 10/2014 | Kim | .................... | H04N 19/513 375/240.03 |
| 2018/0359487 A1 | 12/2018 | Bang et al. | | |

(Continued)

FOREIGN PATENT DOCUMENTS

| | | |
|---|---|---|
| KR | 10-2018-0107001 A | 10/2018 |
| KR | 10-1906066 B1 | 10/2018 |

OTHER PUBLICATIONS

Doré et al., "M44588 RVS Based 3DOF+EVIDENCE Results," technicolor.com, 2018, 38 pages.

(Continued)

*Primary Examiner* — Kathleen V Nguyen
(74) *Attorney, Agent, or Firm* — NSIP Law

(57) ABSTRACT

Disclosed herein is an immersive video processing method. The immersive video processing method may include classifying a multiplicity of view videos into a base view and an additional view, generating a residual video for the additional view video classified as an additional view, packing a patch, which is generated based on the residual video, into an atlas video, and generating metadata for the patch.

7 Claims, 15 Drawing Sheets

(56) References Cited

U.S. PATENT DOCUMENTS

2019/0089898 A1    3/2019  Kim et al.
2019/0320164 A1*  10/2019  Salahieh .............. H04N 13/344
2020/0021847 A1*   1/2020  Kim .................... H04N 19/597
2020/0228777 A1*   7/2020  Dore ................... H04N 13/161

OTHER PUBLICATIONS

"Call for Proposals on 3DoF+ Visual," International Organization for Standardization Organisation Internationale DE Normalisation ISO/IEC JTC1/SC29/WG11 Coding of Moving Pictures and Audio, ISO/IEC JTC1/SC29/WG11 MPEG/N18145, Jan. 2019, Marrakesh, Morocco, 18 pages.

* cited by examiner

US 11,350,074 B2

METHOD FOR PROCESSING IMMERSIVE VIDEO AND METHOD FOR PRODUCING IMMERSIVE VIDEO

CROSS REFERENCE TO RELATED APPLICATION

The present application claims priority to KR10-2019-0031685, filed 2019 Mar. 20, KR10-2019-0032271, filed 2019 Mar. 21, and KR10-2020-0034454, filed 2020 Mar. 20, the entire contents of which are incorporated herein for all purposes by this reference.

BACKGROUND

Field

The present invention relates to a processing/synthesizing method for an immersive video supporting motion parallax for rotational and translation motions.

Description of Related Art

Virtual reality service evolves towards maximizing senses of immersion and realism by generating an omni-directional video in a realistic or CG (Computer Graphics) format and reproducing the video on an HMD (Head Mounted Display), a smart phone and the like. It is currently known that 6 DoF (Degrees of Freedom) needs to be supported in order to play a natural and highly immersive omni-directional video through an HMD. A 6 DoF video provided on an HMD should be a free video in six directions including (1) the horizontal movement, (2) the vertical rotation, (3) the vertical movement and (4) the horizontal rotation. However, most omni-directional videos based on real images are currently supporting only rotational movements. Therefore, researches on such technical fields as the acquisition and reproduction of 6 DoF omni-directional videos are actively under way.

SUMMARY

For providing a large-capacity immersive video service supporting motion parallax, the present invention aims to provide a file format enabling video reproduction that supports motion parallax only by transmitting as small a video and as little metadata as possible.

Also, the present invention aims to provide a method of removing duplicate data among additional view videos.

Also, the present invention aims to provide a method of rendering transformation information as metadata in patch packing.

The technical objects of the present invention are not limited to the above-mentioned technical objects, and other technical objects that are not mentioned will be clearly understood by those skilled in the art through the following descriptions.

An immersive video processing method according to the present invention may include classifying a multiplicity of view videos into a base view and an additional view, generating a residual video for the additional view video classified as an additional view, packing patches, which are generated based on the residual video, into an atlas video, and generating metadata for the patch. Herein, the metadata may include transformation information of the patch.

In an immersive video processing method according to the present invention, the transformation information may include information of horizontal translation, information of vertical translation and information of rotation for the patch.

In an immersive video processing method according to the present invention, the transformation information may further include scaling information of the patch.

In an immersive video processing apparatus and an immersive video synthesizing method according to the present invention, the residual video may be generated by subtracting a base view video and a layered video of the base view video from the additional view video.

In an immersive video processing method according to the present invention, the layered video may be generated based on temporary residual videos, each of the temporary residual videos may be generated by subtracting the base view video from each of a multiplicity of additional view videos, and the layered video may be generated by removing duplicate data between the base view video and the temporary residual videos.

In an immersive video processing apparatus and an immersive video synthesizing method according to the present invention, the residual video may be generated through pruning with another additional view video that belongs to the same group as the additional view video but has a higher priority than the additional view video.

In an immersive video processing apparatus and an immersive video synthesizing method according to the present invention, the residual video may be generated by subtracting a base view video and a global residual video from the additional view video.

In an immersive video processing apparatus and an immersive video synthesizing method according to the present invention, the global residual video may be generated based on the additional view video and temporary residual videos of view videos belonging to the same group as the additional view video.

The features briefly summarized above with respect to the present invention are merely exemplary aspects of the detailed description below of the present invention, and do not limit the scope of the present invention.

According to the present invention, a file format may be provided which enables video reproduction supporting motion parallax by transmitting as small a video and metadata as possible.

According to the present invention, an amount of data for immersive video processing may be reduced by removing duplicate data among additional view videos.

According to the present invention, an immersive video processing efficiency may be enhanced by rendering transformation information as metadata in patch packing.

Effects obtained in the present invention are not limited to the above-mentioned effects, and other effects not mentioned above may be clearly understood by those skilled in the art from the following description.

DETAILED DESCRIPTION

An immersive video means a video that enables a viewing position of a user to dynamically change in a three-dimensional space. Immersive videos may be classified into such types as 3DoF (Degree of Freedom), 3DoF+, Windowed-6DoF and 6DoF.

A 3DoF video means a video that represents a movement of a viewport by three rotational movements (for example, yaw, roll and pitch). A 3DoF+ video means a video that adds limited translation movements to a 3DoF video. A 6DoF video means a video that represents a movement of a viewport by three rotational movements and three translation movements (for example, (x, y, z) vector).

3DoF+ videos and 6DoF videos may provide a user with motion parallax not only for a rotational movement but also limited or various translation movements (for example, left-right/up-down/front-back).

A 3DoF+ or 6DoF immersive video providing a user with motion parallax may include texture information and depth information. On the other hand, a 3DoF immersive video that does not provide motion parallax may consist of only texture information.

In the embodiments described below, it is assumed that an immersive video may render motion parallax like 3DoF+, Windowed-6DoF or 6DoF videos. However, the embodiments described below may also be applicable to texture information-based immersive videos like 3DoF immersive videos. In case the embodiments described below are applied to an immersive video based on texture information, processing and representation of depth information may be omitted.

In the present invention, 'view' indicates a capturing position of a camera, a viewing position of a viewer, or any other particular position for generating/appreciating an immersive video. 'View video' refers to a video covering a field of vision/view angle of a particular view. For example, a view video may refer to a video captured from a particular view, a video synthesized around a particular view, or a video covering a region seen from a particular view.

A view video may be referred to in various ways according to type or usage. For example, a video captured by a camera located in a particular view or a view video having the best quality in a particular view may be referred to as 'source view video'. In the embodiments described below, according to types or purposes of view videos, such expressions like 'source', 'additional', 'reference' and 'base' may be added in front of 'view video'.

A specific expression may also be added in front of a view where a view video with such an expression being added may obtain the best quality. For example, a 'source view' may indicate a position where a source view video with the best quality may be obtained.

View videos with different views will be distinguished by prefixing such expressions as 'first' and 'second'.

Hereinafter, the present invention will be described in detail.

Figure 1A:
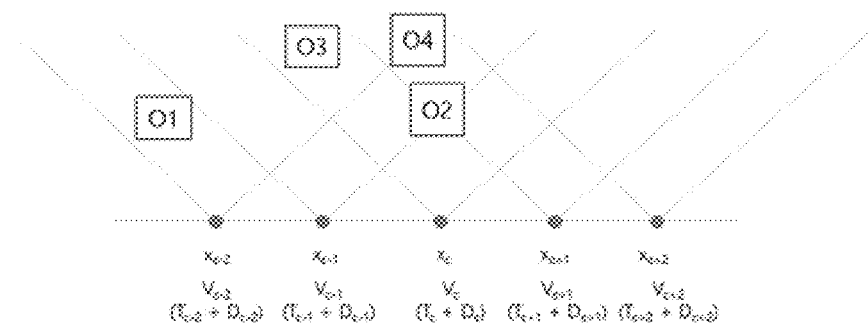
FIGS. 1A and 1B are views illustrating a multiplicity of source view videos according to the present invention.
Figure 1B:
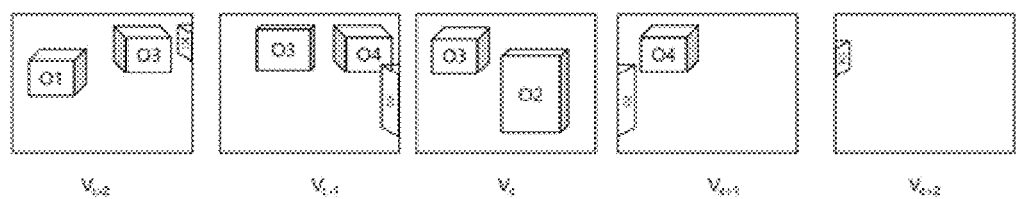

FIGS. 1A and 1B are views illustrating a multiplicity of source view videos according to the present invention.

FIG. 1A shows capturing range (view angle) of each view, and FIG. 1B shows source view videos of each view.

Figure 2:
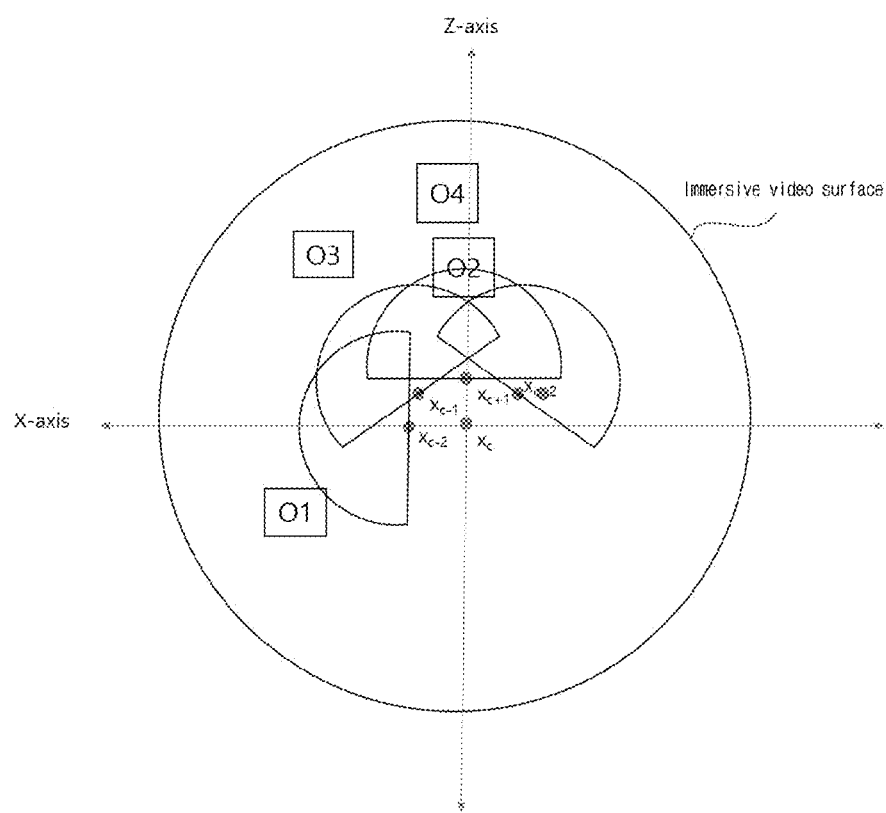
FIG. 2 is a view illustrating a conceptual diagram for generating an immersive video by synthesizing a multiplicity of source view videos.

FIG. 2 is a view illustrating a conceptual diagram for generating an immersive video by synthesizing a multiplicity of source view videos.

In FIGS. 1A, 1B and FIG. 2, $x_n$ represents a capturing view. For example, $x_n$ may represent a capturing view of a camera with the index n.

In FIGS. 1A, 1B and FIG. 2, $V_n$ represents a video captured based on the view $x_n$. According to types of immersive videos, a video $V_n$, which is captured based on the view $x_n$, may include a texture video and/or a depth video. For example, in the case of a 3DoF video, a video $V_n$ may consist only of texture videos. Alternatively, in the case of a windowed-6DoF video based on a monoscopic video, a video $V_n$ may consist only of texture videos. On the other hand, in the case of a 3DoF+ or 6DoF video, a video $V_n$ may include a texture video and a depth video. A texture video captured based on a view $x_n$ is marked by $T_n$, and a depth video captured based on a view $x_n$ is marked by Dn.

Different indexes may be allocated to each source view. Information on an index of a source view may be encoded as metadata. An index allocated to each source view may be set to be the same as an index allocated to each camera.

Alternatively, an index allocated to a camera may be different from an index allocated to a source view. In this case, information indicating a source view corresponding to an index of a camera may be encoded as metadata.

Hereinafter, for the convenience of explanation, an index of a central view is assumed as c, and indexes of other views are assumed as (c+k) or (c−k) according to the distance to a central view or a central camera. For example, a view located on the right of a central view or an index of the view is assumed as (c+1), and an index of a view located on the right of a view with index (c+1) is assumed as (c+2). In addition, an index of a view located on the left of a central view is assumed as (c−1), and an index of a view located on the left of a view with index (c−1) is assumed as (c−2). In addition, it is assumed that an index of a source view is the same as an index of a camera.

In order to realize an immersive video, a base view video and multiview videos excluding the base view video are required. In addition, in order to realize a 3DoF+ or 6DoF-based immersive video, not only monoscopic data (for example, texture videos) but also stereoscopic data (for example, depth videos and/or camera information) are required.

For example, as illustrated in FIGS. 1A, 1B and FIG. 2, an immersive video may be generated by synthesizing a view video Vc captured in a central position xc and view videos Vc−1, Vc−2, Vc+1, and Vc+2 captured in non-central positions. Here, the view video $V_c$ may represent a view video seen when a viewer is in a central position, and the view videos $V_{c-1}$, $V_{c-2}$, $V_{c+1}$, and $V_{c+2}$ of non-central positions may represent view videos seen when the viewer is not in the central position.

As an immersive video is implemented based on multi-view video data, an effective storage and compression technique for large video data is required for capturing, generating, transmitting, and reproducing an immersive video.

The present invention provides an immersive video generation format and compression technique that can store and compress a 3DoF+ or 6DoF immersive video supporting motion parallax while maintaining compatibility with a 3DoF-based immersive video.

Figure 3:
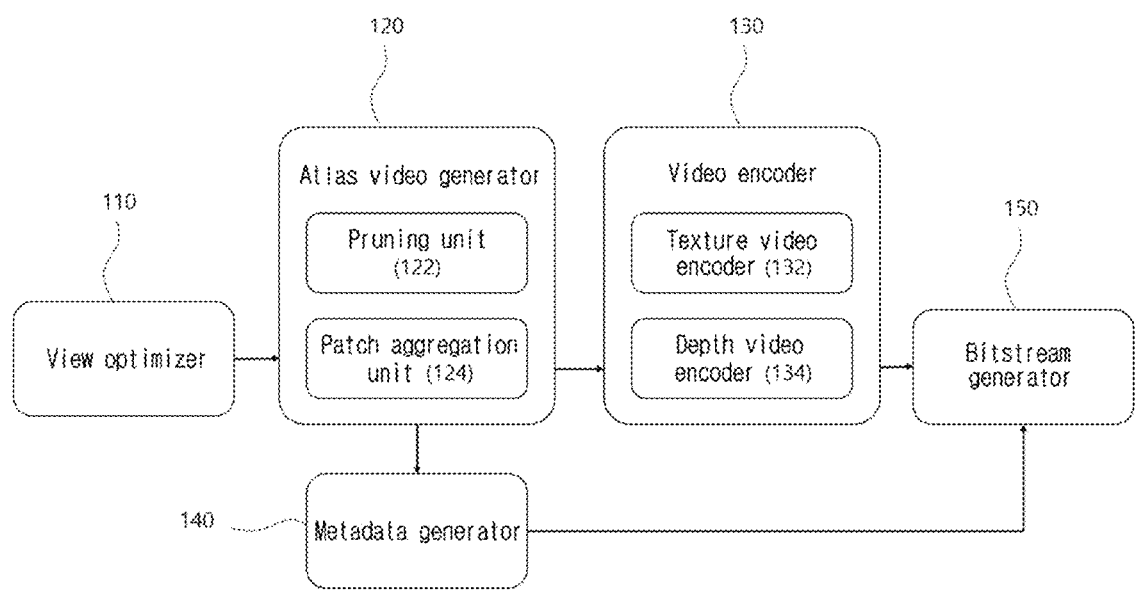
FIG. 3 is a block diagram of an immersive video processing apparatus according to an embodiment of the present invention.

FIG. 3 is a block diagram of an immersive video processing apparatus according to an embodiment of the present invention.

Referring to FIG. 3, an immersive video processing apparatus according to the present invention may include a view optimizer 110, an atlas video generator 120, a metadata generator 130, a video encoder 140 and a bit stream generator 150.

A view optimizer 110 classifies a multiplicity of source view videos into base view videos and non-base view videos. Specifically, a view optimizer 110 may select at least one among a multiplicity of source view videos as a base view video. For example, a view optimizer 110 may select a source view video, of which the view is in a central position, as a base view video among source view videos.

Alternatively, a view optimizer 110 may determine a base view video on the basis of a camera parameter. Specifically, a view optimizer 110 may determine a base view video on the basis of a camera index, an order of priority among cameras, a camera position or whether or not a camera is a ROI camera.

For example, a view optimizer 110 may determine a source view video captured through a camera with a smallest (or largest) camera index, a source view video captured through a camera with a predefined index, a source view video captured through a camera with a highest (lowest) priority, a source view video captured through a camera in a particular position (for example, central position) or a source view video captured through a ROI camera as a base view video.

Alternatively, a view optimizer 110 may select a base view video on the basis of the qualities of source view videos. For example, a view optimizer 110 may select a source view video with the best quality among source view videos as a base view video.

Alternatively, a view optimizer 110 may examine a degree of duplication among source view videos and select a base view video on the basis of a descending (or descending) order of duplicate data with other source view videos.

Alternatively, a view optimizer 110 may select a base view video on the basis of data (for example, metadata) input from outside. Data input from outside may include at least one among an index specifying at least one among a multiplicity of cameras, an index specifying at least one among a multiplicity of capturing views, and an index specifying at least one among a multiplicity of source view videos.

A source view video that is not selected as a base view video may be referred to as an additional view video or a non-base view video.

A multiplicity of source view videos may also be selected as base view videos.

An atlas video generator 120 may generate residual data of an additional view video by subtracting a base view video from the additional view video and then may generate an atlas video based on the residual data.

An atlas video generator 120 may include a pruning unit 122 and a patch aggregation unit 124.

A pruning unit 122 performs pruning for an additional view video. Pruning may be intended to remove duplicate data with a base view video within an additional view video. As a result of pruning, residual data for an additional view video may be generated.

Source view videos generated by capturing the same object in different views may have common data. Accordingly, when a base view video is subtracted from an additional view video, data that are not included in the base view video may be generated as residual data for the additional view video.

FIG. 4A to FIG. 6 are views illustrating examples of generating residual data for an additional view video.

Figure 4A:
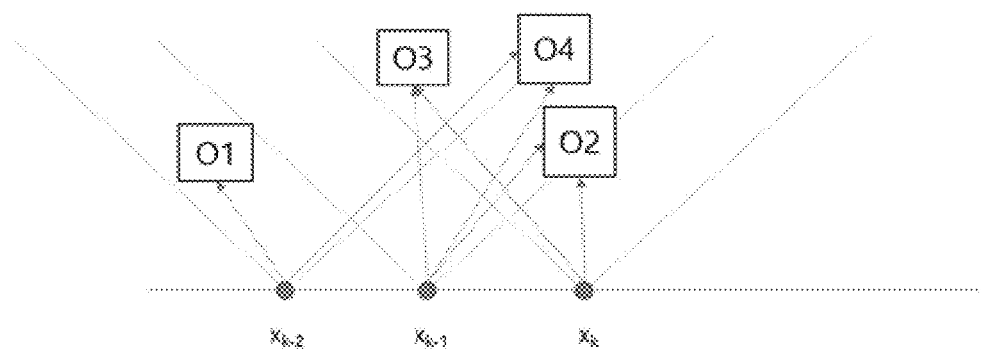
FIG. 4A to FIG. 6 are views illustrating examples of generating residual data for an additional view video.
Figure 4B:
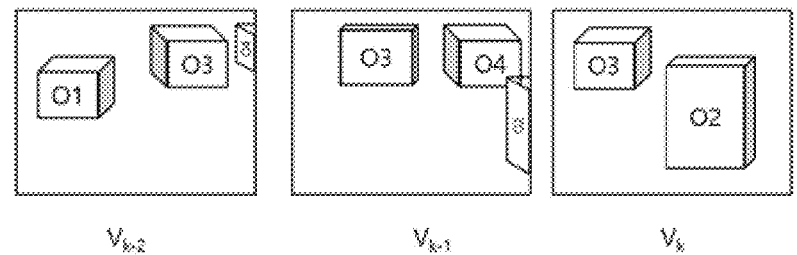
Figure 5:
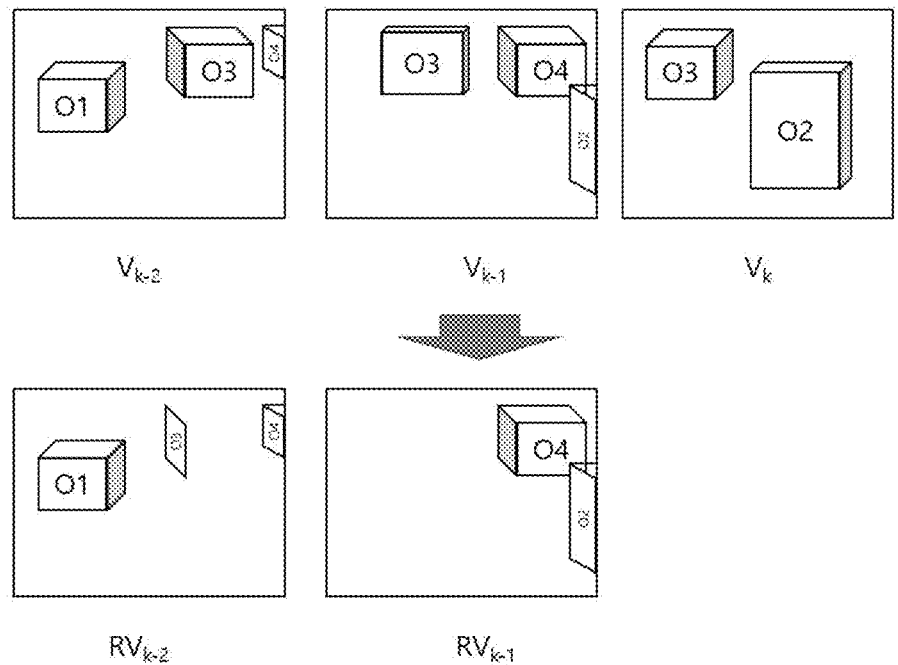

In the example illustrated in FIGS. 4A and 4B, $V_n$ represents a video captured from a view $x_n$. For the convenience of explanation, a base view video is assumed to be $V_k$.

In a windowed-6DoF video based on a monoscopic video, a base view video may be a 2D video. On the other hands, in a 3DoF+ or 6DoF video based on an omni-directional video, a base view video may be a 3D or 3DoF video including a texture video and a depth video.

In the example illustrated in FIG. 4A, the arrows of solid lines indicate data seen in a base view $x_k$. Although the view angle of the view $x_k$ includes objects O2, O3 and O4, since the object O4 is covered by the object O3, the object O4 is not seen in the view $x_k$. Accordingly, as illustrated in the example of FIG. 4B, a base view video $V_k$ may include data of the objects O2 and O3 but may not include data of the object O4.

In the example illustrated in FIG. 4A, the arrows of dotted lines indicate data that are not seen in a base view video but seen in an additional view video. A view angle of a view $x_{k-1}$ includes objects O2, O3 and O4. As data for the objects O2 and O3 are also included in a base view video $V_k$, some duplicate data may exist for the objects O2 and O3 between an additional view video $V_{k-1}$ and the base view video $V_k$. On the other hand, the additional view video $V_{k-1}$ includes data for the object O4, while the base view video $V_k$ does not include data for the object O4.

A view angle of a view $x_{k-2}$ includes objects O1, O3 and O4. As data for the object O3 are also included in a base view video $V_k$, some duplicate data may exist for the object O3 between an additional view video $V_{k-2}$ and the base view video $V_k$. On the other hand, the additional view video $V_{k-2}$ includes data for the objects O1 and O4, while the base view video $V_k$ does not include data for the objects O1 and O4.

Residual data for an additional view video may be generated by subtracting a base view video from the additional view video.

For example, by subtracting a base view video $V_k$ from an additional view video $V_{k-1}$, a residual video $RV_{K-1}$ for the additional view video $V_{k-1}$ may be generated. In the example illustrated in FIG. 5, a residual video $RV_{k-1}$ is illustrated to include some data for the object O2, which is not included in a base view video $V_k$, and data for the object O4. Since data for the object O3 included in an additional view video $V_{k-1}$ are all included in a base view video $V_k$, it may be understood that the data are not included in a residual video $RV_{k-1}$. In other words, a residual video $RV_{k-1}$ may represent a video including data that are not included in a base view video $V_k$ but are included in an additional view video $V_{k-1}$.

Likewise, by subtracting a base view video $V_k$ from an additional view video $V_{k-2}$, a residual video $RV_{K-2}$ for the additional view video $V_{k-2}$ may be generated. In the example illustrated in FIG. 5, a residual video $RV_{k-2}$ is illustrated to include some data for the object O3, data for the object O1, and data for the object O4.

From the perspective of image signal processing, a residual video $RV_{k-n}$ may be an additional video consisting of regions that are obtained by removing an overlapping region with a base view video $V_k$ in an additional view video $V_{k-n}$.

When a source view video includes both a texture video and a depth video, pruning may be performed the texture video and the depth video respectively. In consequence, residual data for an additional view video may include at least one of residual data for a texture video or residual data for a depth video.

For example, in the case of a 3DoF+ or 6DoF-based immersive video, a residual video $RV_{k-n}$ may include a texture residual video $RT_{k-n}$ and a depth residual video $RD_{k-n}$.

Alternatively, pruning may be performed only for a depth video, and a texture residual video may be generated based on a depth residual video.

For example, by subtracting a depth video of a base view video from a residual video of an additional view video, a depth residual video for the additional view video may be generated, and a mask image may be generated based on the generated depth residual video. The mask image indicates a depth residual video where a pixel value is 1 in a region having residual data and a pixel value is 0 in the remaining region. A residual video for an additional view video may be obtained by masking a generated mask image to a texture video of the additional view video.

In case there is a multiplicity of base view videos, residual data for an additional view video may be generated by subtracting each of the multiplicity of base view videos from the additional view video. Alternatively, residual data for an additional view video may be generated by selecting at least one among a multiplicity of base view videos and subtracting the selected base view video from the additional view video.

In case residual data are generated by removing duplicate data between an additional view video and a base view video, duplicate data between additional view videos are not removed, which is problematic. For example, as illustrated in FIG. 6, both a residual video $RV_{k-1}$ of an additional view video $V_{k-1}$ and a residual video $RV_{k-2}$ of an additional view video $V_{k-2}$ include common data for the object O4.

In order to remove duplicate data among additional view videos, pruning may be performed for at least some of additional videos by using a basic view video and other additional view videos. Thus, residual data of an additional view video may be generated by removing duplicate data with a basic view video and duplicate data with another additional view video.

For example, a residual video $RV_{k-2}$ for an additional view video $V_{k-2}$ may be generated by subtracting a base view video $V_k$ and an additional view video $V_{k-1}$ from an additional view video $V_{k-2}$ or by subtracting the base view video $V_k$ and a residual video $RV_{k-1}$ of the additional view video $V_{k-1}$ from the additional view video $V_{k-2}$.

Figure 6:
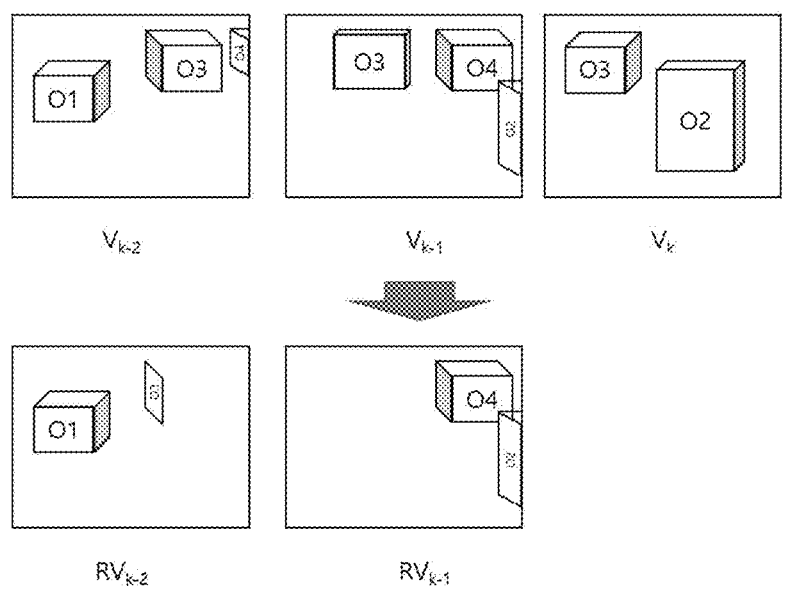

Thus, as in the example illustrated in FIG. 6, a residual video $RV_{k-2}$ for an additional view video $V_{k-2}$ may be generated by removing data for the object O4 included in a residual video $RV_{k-1}$.

Pruning of a source view video $V_n$ corresponding to a particular view $x_n$ may be performed by using an additional view video $R_{n+1}$ of an adjacent view $x_{n+1}$. Here, an adjacent view may be a view of which the view index difference from a current view is 1 or a predefined value.

For example, pruning for an additional view video, of which the view index difference from a base view is 1, may be performed by using the base view video. On the other hand, pruning for an additional view video, of which the view index difference from a base view exceeds 1, may be performed by using an adjacent additional view video together with the base view video.

From a view $x_n$, a source view video $V_n$ may be obtained with best quality. In addition, a source view video $V_m$, which is captured from a view $x_m$ that is different from a view $x_n$, may have duplicate data with a source view video $V_n$ captured from the view $x_n$. Thus, since a source view video $V_m$ is not the best source view video for a view $x_n$ but includes data seen from the view $x_n$, the source view video $V_m$ may be referred to as a shared view video for the view $x_n$. Also, a view $x_m$ where a shared view video $V_m$ can be obtained with best quality may be defined as a shared view for a view $x_n$.

For example, an additional view video $V_{k-2}$ having duplicate with another additional view video $V_{k-1}$ may be a shared view video of the additional view video $V_{k-1}$.

Pruning of a shared view video may be performed by using an additional view video having common data with a shared view video. For example, pruning for an additional view video $V_{k-2}$ may be performed by using an additional view video $V_{k-1}$ having common data with an additional view video $V_{k-2}$.

A view video used for generating residual data or a view video necessary for video synthesis may be referred to as a reference view video. For example, for a shared view video $V_{k-2}$, a basic view video $V_k$ and an additional view video $V_{k-1}$ may function as reference view videos. Particularly, an additional view video used as a reference view video of another additional view video may be referred to as an additional reference view video.

An order of pruning priority may be set among additional view videos. According to an order of pruning priority among additional view videos, it may be determined whether or not another additional view video is used. A higher priority indicates earlier pruning.

For example, residual data of an additional view video with the highest priority (for example, priority 0) may be generated by subtracting a base view video from the additional view video. On the other hand, residual data of an additional view video with a lower priority (for example, priority 1) may be generated by subtracting a base view video and an additional reference view video (for example, priority 0) from the additional view video. In other words, pruning of additional view videos may be hierarchically performed.

An order of priority among additional view videos may be determined by an index difference from a base view video. For example, an order of priority among additional view videos may be determined in an ascending or descending order of an index difference from a base view video.

Alternatively, an order of priority among additional view videos may be determined by considering an amount of duplicate data with a base view video. For example, an order of priority among additional view videos may be determined in a descending or ascending order of duplicate data with a base view video.

Pruning of an additional view video with a low priority may be performed by using another additional view video next above the additional view video in priority. For example, residual data for an additional view video $V_{k-n}$ may be generated by subtracting a base view video $V_k$ and another additional view video $V_{k-n+1}$ from the additional view video $V_{k-n}$.

In case there is a multiplicity of additional view videos with a high priority, pruning for the additional view videos may be performed by using all or some of base view videos with a higher priority than the additional view videos. For example, for residual data for an additional view video $V_{k-n}$, at least one among a base view video $V_k$ and a multiplicity of additional view videos ranging from $V_{k-1}$ to $V_{k-n+1}$ may be used.

Alternatively, the number of additional view videos used for pruning an additional view video may be already stored in an immersive video processing apparatus.

A patch aggregation unit 124 generates an atlas video by collecting residual data of additional view videos. Specifically, square patches may be generated by extracting data included in a residual video, and the patches extracted from a multiplicity of residual videos may be packed into one video. A video generated by packing patches may be defined as an atlas or an atlas video. An atlas video may also be referred to as a packed video.

An atlas video may include a texture video and/or a depth video.

An atlas video generator 120 may also generate an atlas occupancy map showing an occupancy aspect of patches in an atlas video. An atlas occupancy map may be generated in the same size as an atlas video.

A pixel value of an atlas occupancy map may be set by an index value of patches in an atlas video. For example, pixels in a region (for example, a collocate region) corresponding to a region occupied by a first patch in an atlas video may be set as an index value allocated to the first patch. On the other hand, pixels in a region corresponding to a region occupied by a second patch in an atlas video may be set as an index value allocated to the second patch.

A metadata generator 130 generates metadata for view video synthesis. Specifically, a metadata generator 130 may format residual video-related additional information that is packed into an atlas.

Metadata may include various information for view video synthesis.

For example, metadata may include view number information. View number information is information for distinguishing views of each source view video. For example, a view number may be an index or ID distinguishing each of a multiplicity of source views. View number information may include at least one of source view number information or shared view number information.

For an arbitrary view video, source view number information indicates a view number or a view position where the view video is obtained with best quality. Shared view number information indicates the number or position of another view where data included by the view video are obtained, apart from a view (that is, source view) where the view video is obtained with best quality.

In other words, for an arbitrary source video, information specifying a source view number or a shared view number may be encoded.

Metadata may include information of a camera. Information of a camera may include at least one of an extrinsic parameter or an intrinsic parameter of a camera. An extrinsic parameter of a camera may include information indicating a capturing position of the camera.

Metadata may include information on a source view. Information on a source view may include at least one among information on the number of source views, information specifying a camera corresponding to a source view, and information on a source view video. Information on a source view video may include information on the size or quality of a source view video.

Metadata may include information on a base view video. Information on a base view video may include at least one of information on a source view selected as a base view or information on the number of base view videos. For example, index information specifying a source view video, which is selected as a base view video among a multiplicity of source view videos, may be included in metadata.

Metadata may include information on a reference view video. Information on a reference view video may include at least one of information for specifying a reference view video, which is used to generate residual data of a source view video, or information for specifying the number of reference view videos. For example, index information for specifying an additional reference view video, which is used to generate a residual video for an additional view video, among a multiplicity of source view videos, may be included in metadata. The index information may be encoded for each additional view video. Alternatively, information indicating the number of additional reference view videos, which are used to generating a residual video of an additional view video, may be included in metadata.

Metadata may include information on a priority order of pruning. Information on a priority order of pruning may include at least one among a priority order of a multiplicity of base views, a priority order among additional views and information showing whether or not an additional view is a shared view.

Metadata may include information on a priority order of videos. A priority order of videos may include at least one among a priority order among source views, a priority order among base views and a priority order among atlas videos. When a data rate is limited, at least one of whether a video is transmitted or a bit rate allocated to a video transfer may be determined based on information of a priority order of videos. Alternatively, a priority order may also be determined according to view indexes of shared view videos.

Alternatively, information on a priority order of videos may be used to set an region to be inpainted to have a lower importance than a covering region, since the quality of an region to be inpainted is relatively lower than that of a region obtained by a real camera.

Metadata may include information on an atlas video. Information on an atlas video may include at least one among information on the number of atlas videos, information on the size of an atlas video and information on patches in an atlas video. Patch information may include at least one among index information for distinguishing a patch in an atlas video, information showing a source view, which is a source of a patch, information on the position/size of a patch in an atlas video, and information on the position/size of a patch in a source view video.

A video encoder 140 encodes a base view video and an atlas video. A video encoder may include a texture video encoder 142 for a texture video and a depth video encoder 144 for a depth video.

A bit stream generator 150 generates a bit stream on the basis of an encoded video and metadata. A bit stream thus generated may be transmitted to an immersive video output apparatus.

Figure 7:
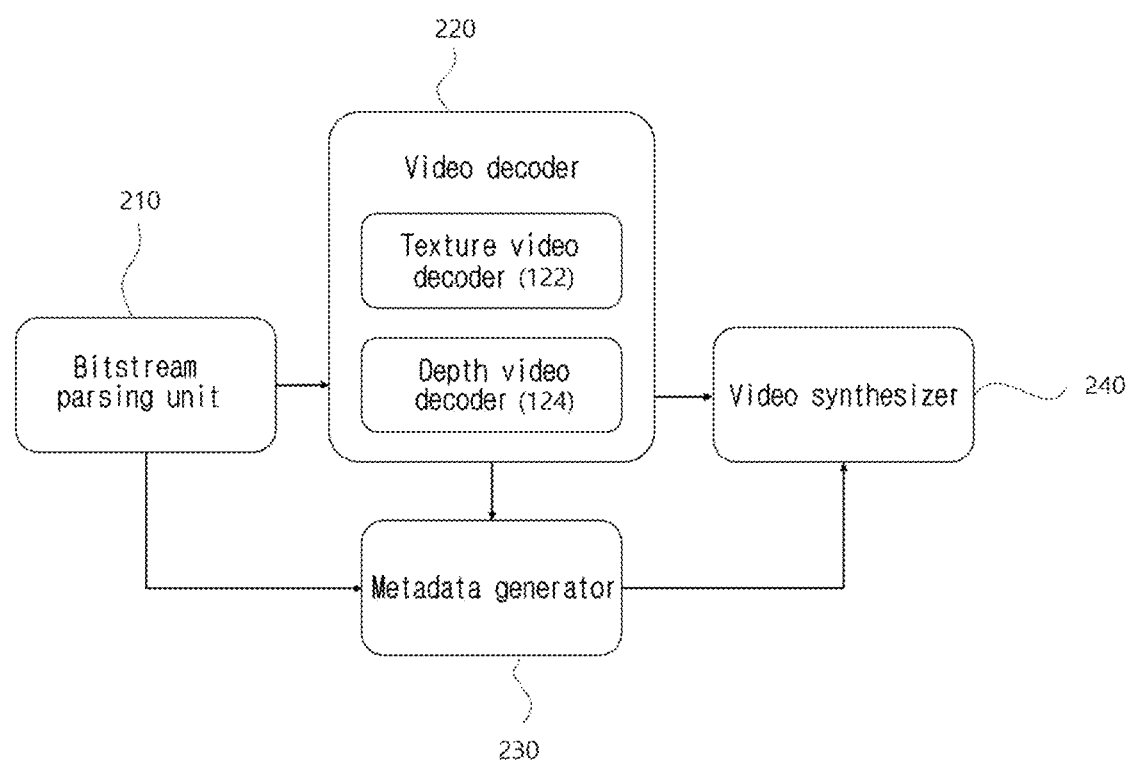
FIG. 7 is a block diagram of an immersive video output apparatus according to the present invention.

FIG. 7 is a block diagram of an immersive video output apparatus according to the present invention.

Referring to FIG. 7, an immersive video output apparatus according to the present invention may include a bit stream parsing unit 210, a video decoder 220, a metadata processor 230 and a video synthesizer 240.

A bit stream parsing unit parses video data and metadata from a bit stream. Video data may include data of an encoded base view video and data of an encoded atlas video.

A video decoder 220 decodes parsed video data. A video decoder 220 may include a texture video decoder 222 for decoding a texture video and a depth video decoder 224 for decoding a depth video.

A metadata processor 230 unformats parsed metadata.

Unformatted metadata may be used to synthesize a view video. For example, in order to synthesize a viewport video corresponding to a viewing position of a user, a metadata processor 230 may determine the position/size of necessary patches for viewport video synthesis in an atlas video by using metadata.

A video synthesizer 240 may dynamically synthesize a viewport video corresponding to a viewing position of a user. For viewport video synthesis, a video synthesizer 240 may extract necessary patches for synthesizing a viewport video from an atlas video. Specifically, based on metadata that are unformatted in a metadata processor 230, a source view number or a shared view number corresponding to a viewing position of a user, information on the position/size of each patch within an atlas video, or a camera parameter may be extracted.

When a source view number and/or a shared view number corresponding to a viewing position of a user is determined, patches that are extracted from view videos corresponding to the determined source view number and/or the determined shared view number and the positions/sizes of the patches may be determined among patches included in an atlas video.

Then, a patch corresponding to a position/size thus determined may be filtered and separated from an atlas video. When patches necessary for synthesis of a viewport video are extracted, the viewport video may be generated by synthesizing a base view video and the patches.

Specifically, after warping and/or transforming a base view video and patches into a coordinate system of a viewport, a viewport video may be generated by merging a warped and/or transformed base view video and warped and/or transformed patches.

Based on the above description, a method of generating residual data for a source view video and a view video synthesis method will be described in further detail.

Figure 8:
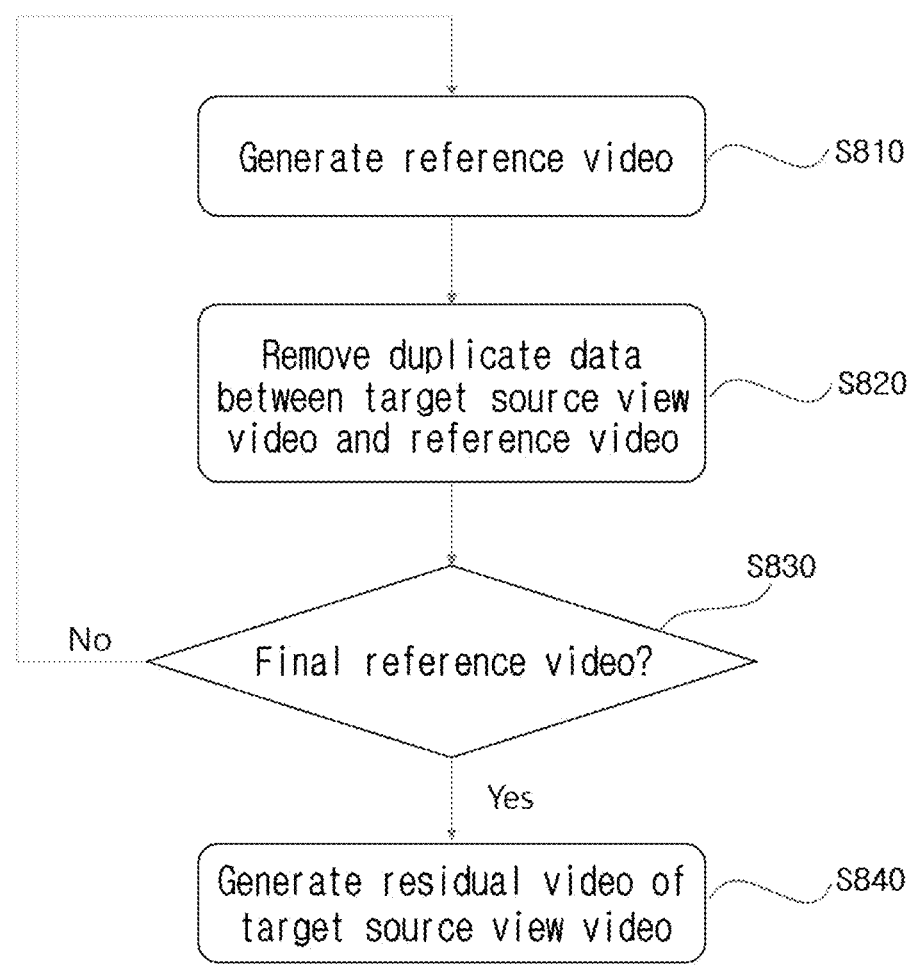
FIG. 8 is a flowchart illustrating a method of generating residual data of a source view video according to an embodiment of the present invention.

FIG. 8 is a flowchart illustrating a method of generating residual data of a source view video according to an embodiment of the present invention.

Residual data may be generated by subtracting a second source view video from a first source view video. Here, a first source view video represents an additional view video, and a second source view video represents at least one of a base view video or an additional reference view video.

In order to remove redundancy between a first source view video and a second source view video, the second source view video may be warped based on the first source view video (S810). Specifically, residual data for a first source view video may be generated by warping a second source view video to a coordinate system of the first source view that is a target view and subtracting the warped second source view video from the first source view video.

Alternatively, residual data for a first source view video may be generated by warping the first source view video to a coordinate system of a second source view and then subtracting the warped first source view video from the second source view video.

A warped source view video will be referred to as a reference video.

Warping may be performed based on a 3D warping algorithm which warps a depth map of a second source view video and then also warps a texture video based on the warped depth map. Warping of a depth map may be performed based on a camera parameter. 3D warping may be performed in the following steps.

Step 1) Back projection from a source view video coordinate system to a three-dimensional space coordinate system Step 2) Projection from a three-dimensional space coordinate system to a coordinate system of a target view video Equation 1 shows a back projection of a coordinates of a source view video $V_k$ to a three-dimensional space coordinate system.

$$\begin{bmatrix} X \\ Y \\ Z \end{bmatrix} = P_K^{-1} \cdot \begin{bmatrix} x_k \\ y_k \\ z_k \end{bmatrix} \qquad \text{Equation 1}$$

A projection matrix P may be obtained from an intrinsic parameter K and extrinsic parameters R and T of a camera, which are obtained through a camera calibration process. Specifically, a projection matrix P may be derived based on Equation 2 below.

$$P = K \cdot RT \qquad \text{Equation 2}$$

Equation 3 shows a projection of coordinates, which are back projected to a three-dimensional space coordinate system, to a coordinate system of a target view video $V_{k-1}$.

$$\begin{bmatrix} x_{k-1} \\ y_{k-1} \\ z_{k-1} \end{bmatrix} = P_{k-1} \cdot \begin{bmatrix} X \\ Y \\ Z \end{bmatrix} \qquad \text{Equation 3}$$

To perform 3D warping for a source view video that is a two-dimensional data array, as expressed in Equation 1 and Equation 3, a depth value corresponding to Z value may be additionally required.

As a result of warping, an unseen portion in a source view video may be left as a hole in a reference video.

A first source view video may be compared with a reference video, and duplicate data with the reference video may be removed from the first source view video (S820).

Figure 9:
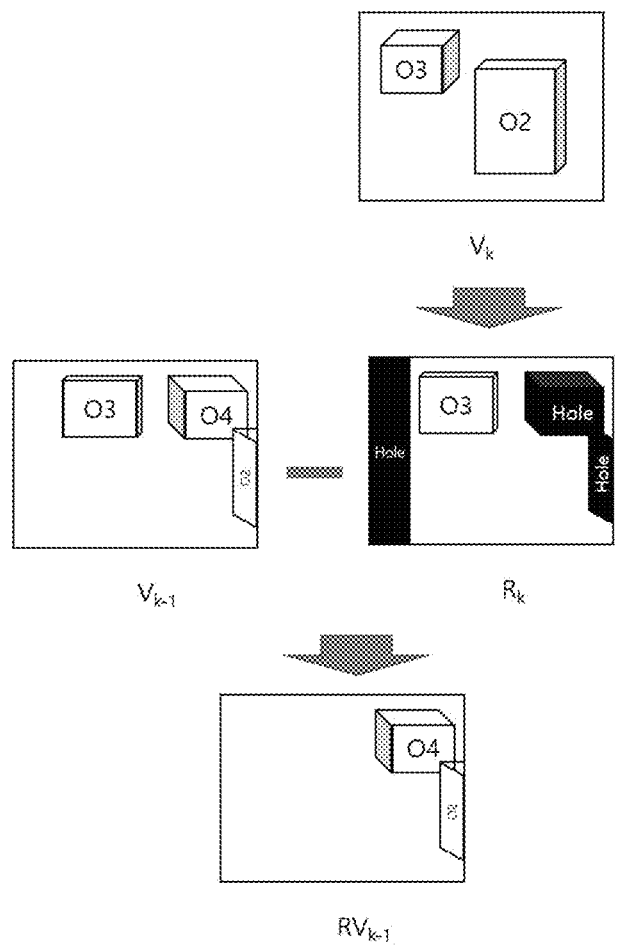
FIG. 9 is a view for explaining an example of discriminating duplicate data between a source view video and a reference video.

FIG. 9 is a view for explaining an example of discriminating duplicate data between a source view video and a reference video.

In order to generate residual data for an additional view video $V_{k-1}$, 3D warping for a base view video $V_k$ may be performed and thus a reference video $R_k$ may be generated. Here, an unseen region in a base view video $V_k$ may be left as a hole in a reference video $R_k$. Specifically, information on an object O4 and information on the left side of an object O2, which are unseen in a base view video $V_k$, may be left as hole.

A hole represents a region where no video data exist, and a sample value in a hole may be set to a default value (for example, 0).

A residual video $RV_{k-1}$ for an additional view video $V_{k-1}$ may be generated by subtracting a reference video $R_k$ from the additional view video $V_{k-1}$. Specifically, duplicate data may be detected by comparing at least one of a texture value or a depth value between an additional view video and a reference video. Specifically, when a difference of pixel value between a first source view video and a reference video is smaller than a preset threshold, a corresponding pixel may be considered as duplicate data since the pixel value are data for the same position in a three-dimensional space.

For example, as illustrated in FIG. 9, information on an object O3 in an additional view video $V_{k-1}$ and a reference video $R_k$ may be determined as duplicate data. On the other hand, a difference of pixel values between an additional view video and a reference video is equal to or greater than a preset threshold, a corresponding pixel may not be determined as duplicate data. For example, as illustrated in FIG. 9, data for an object O4 and the left side of an object O2 in an additional view video $V_{k-1}$ may not be determined as duplicate data.

Duplicate data detection may be performed by comparing pixels in the same position between an additional view video and a reference video. Alternatively, duplicate data may be detected by performing sub-sampling of pixels and then comparing pixels of the same position (for example, pixels with the same coordinates).

Duplicate data may be detected by using both a texture video and a depth video. For example, when a difference of pixels for a texture video is within a threshold range and a difference of pixels for a depth video is within a threshold range, the pixels may be determined as duplicate data. A threshold range for a texture video and a threshold range for a depth video may be set differently.

After an additional view video is warped to a coordinate system of a base view video, residual data for the additional view video may be generated.

Figure 10:
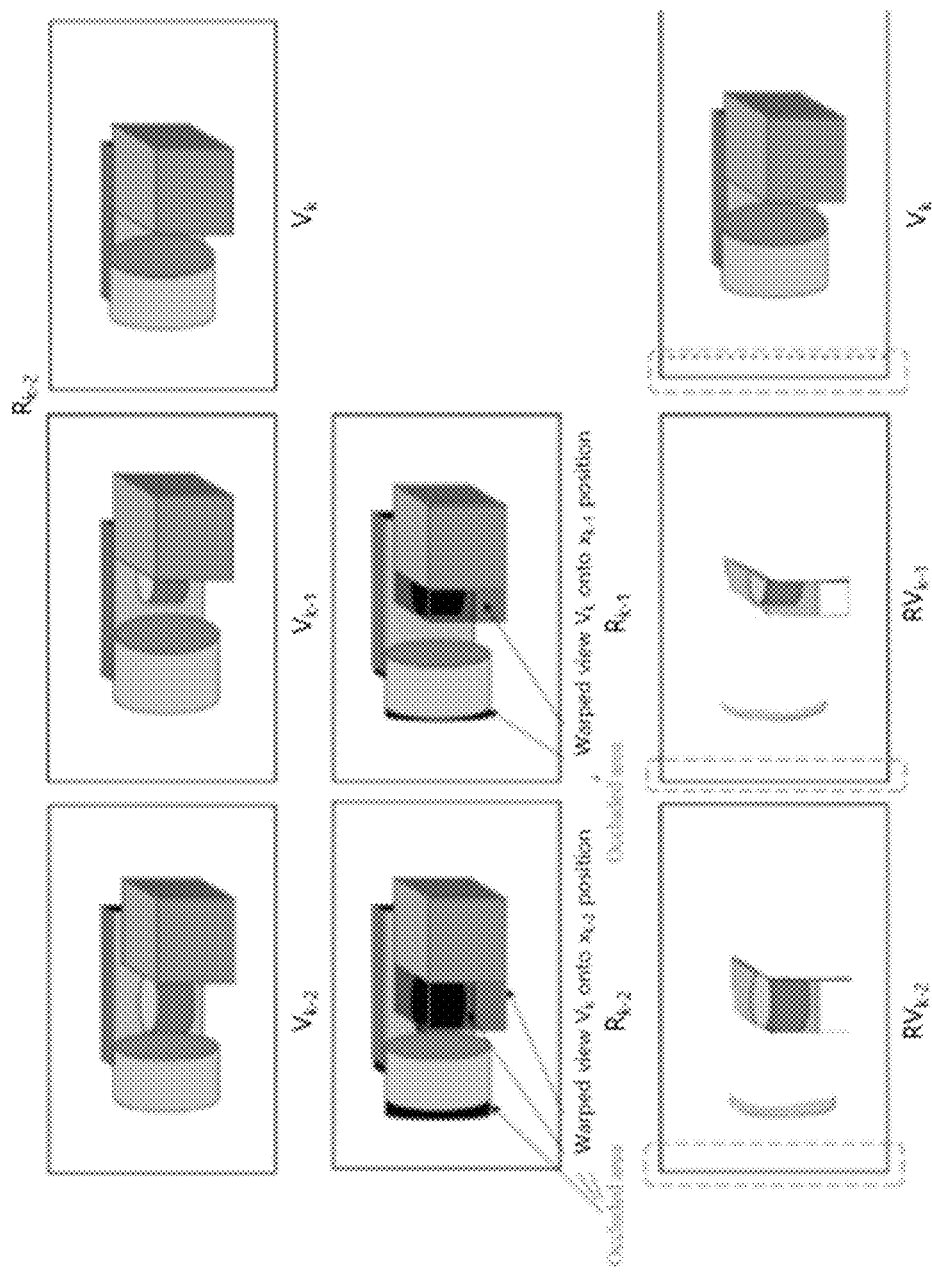
FIG. 10 is a view for explaining another example of discriminating duplicate data between a source view video and a reference video.

FIG. 10 is a view for explaining another example of discriminating duplicate data between a source view video and a reference video.

In order to generate residual data for an additional view video $V_{k-1}$, a base view video $V_k$ may be 3D-warped to a coordinate system of a view $x_{k-1}$. In FIG. 10, it is illustrated that a reference video $R_{k-1}$ is generated by performing 3D warping of a base view video $V_k$ to a coordinate system of a view $x_{k-1}$. Here, an unseen region in a base view video $V_k$ may be left as a hole in a reference video $R_{k-1}$. For example, in FIG. 10, portions marked as 'occluded area' indicate the portions that are unseen in a base view video.

After duplicate data between a reference view $R_{k-1}$ and an additional view video $V_{k-1}$, the detected duplicated data may be removed from the additional view video $V_{k-1}$. By removing duplicate data, a residual video $RV_{k-1}$ for an additional view video $V_{k-1}$ may be generated.

To generate residual data for an additional view video $V_{k-2}$, a base view video $V_k$ may be 3D-warped to a coordinate system of a view $x_{k-2}$. In FIG. 10, it is illustrated that a reference video $R_{k-2}$ is generated by performing 3D warping of a base view video $V_k$ to a coordinate system of a view $x_{k-2}$. Here, an unseen region in a base view video $V_k$ may be left as a hole in a reference video $R_{k-2}$.

After duplicate data between a reference view $R_{k-2}$ and an additional view video $V_{k-2}$, the detected duplicated data may be removed from the additional view video $V_{k-2}$. By removing duplicate data, a residual video $RV_{k-2}$ for an additional view video $V_{k-2}$ may be generated.

When a multiplicity of reference videos is used to generate residual data for a first source view video (S830), the reference video generation (S810) and the duplicate data removal (S820) may be repeatedly performed for each of the multiplicity of source view videos. In other words, a residual video of a first source view video may be generated by removing duplicate data for a multiplicity of reference videos (S840).

For example, if it is assumed that a second source view video and a third source view video are used as reference view videos for pruning of a first source view video, a first reference video, which is generated by warping the second source view video, and a second reference video, which is generated by warping the third source view video, may be used to generate a residual video for the first source view video.

For example, as illustrated in FIG. 7, a residual video $RV_{k-2}$ of a second additional view video $V_{k-2}$ may be generated by using a first reference video $R_k$, which is generated by warping a base view video $V_k$, and a second reference video $R_{k-1}$ for a first additional view video $V_{k-1}$. Here, a second reference video $R_{k-1}$ may be generated by warping a first additional view video $V_{k-1}$ or by warping a first residual video $RV_{k-1}$. Accordingly, a second residual video $RV_{k-2}$ may be generated by removing duplicate data between a second additional view video $V_{k-2}$ and a base view video $V_k$ and duplicate data between the second additional view video $V_{k-2}$ and a first additional view video $V_{k-1}$.

When the number of source view videos increases, the amount of data to be processed becomes excessively large, which may cause a difficulty with data processing. For this reason, removing duplicate data among additional view videos is worthy of consideration for reducing data throughput. Hereinafter, a method of removing duplicate data among additional view videos will be described in detail.

Figure 11:
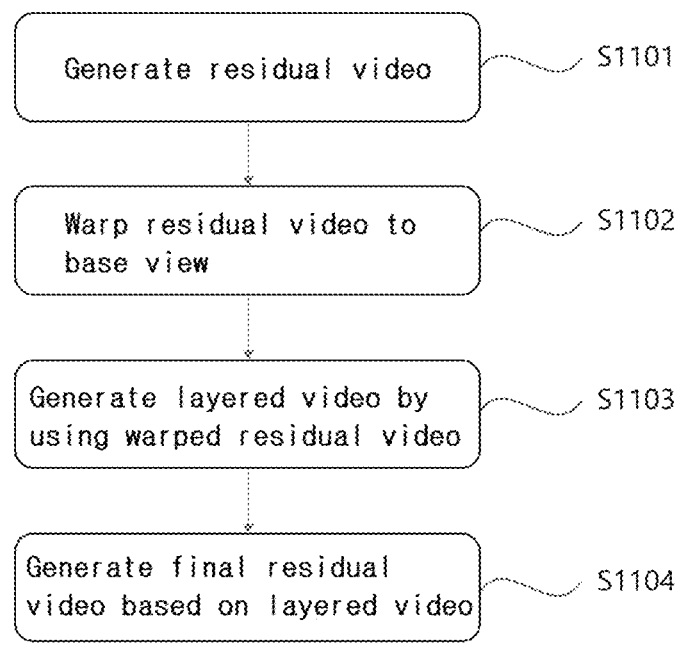
FIG. 11 is a flowchart illustrating a method of removing an overlapping region among additional view videos in accordance with an embodiment of the present invention.

FIG. 11 is a flowchart illustrating a method of removing an overlapping region among additional view videos in accordance with an embodiment of the present invention.

Referring to FIG. 11, a base view video is selected first, and then a residual video for each additional view may be generated by using the selected base view video (S1101). At least one among a multiplicity of source view videos may be selected as a base view video. Alternatively, a base view video may be generated by synthesizing a multiplicity of source view videos.

When residual videos for additional view videos are generated, the generated residual videos may be 3D-warped to a base view (S1102). Here, residual videos may be 3D-warped to a base view, or pixels corresponding to a residual video within an additional view video may be 3D-warped.

A base view is a view referred to when a multiplicity of residual videos is warped. For example, a position where a base view video can be obtained with best quality may be selected as a base view. Alternatively, a base view may be selected from at least one among a view among additional views, a virtual view of a random position (for example, position of a virtual camera), a reference view, and at least one view position among cameras. Here, a reference view is a view position where a reference view video used for generating a residual video can be obtained with best quality.

There may be a multiplicity of view candidates for a base view. In this case, one of a multiplicity of view candidates may be selected as a base view for 3D warping of residual videos.

There may be a multiplicity of base views. In case there is a multiplicity of base views, a base view may be selected for each reference video.

When a reference video is generated by performing 3D warping of a residual video based on a coordinate system of a base view, a portion that is unseen in a base view video may be extracted from the reference video. A portion thus extracted may be generated as a layered video for a base view (S1103).

Figures 12, 13A, 13B:
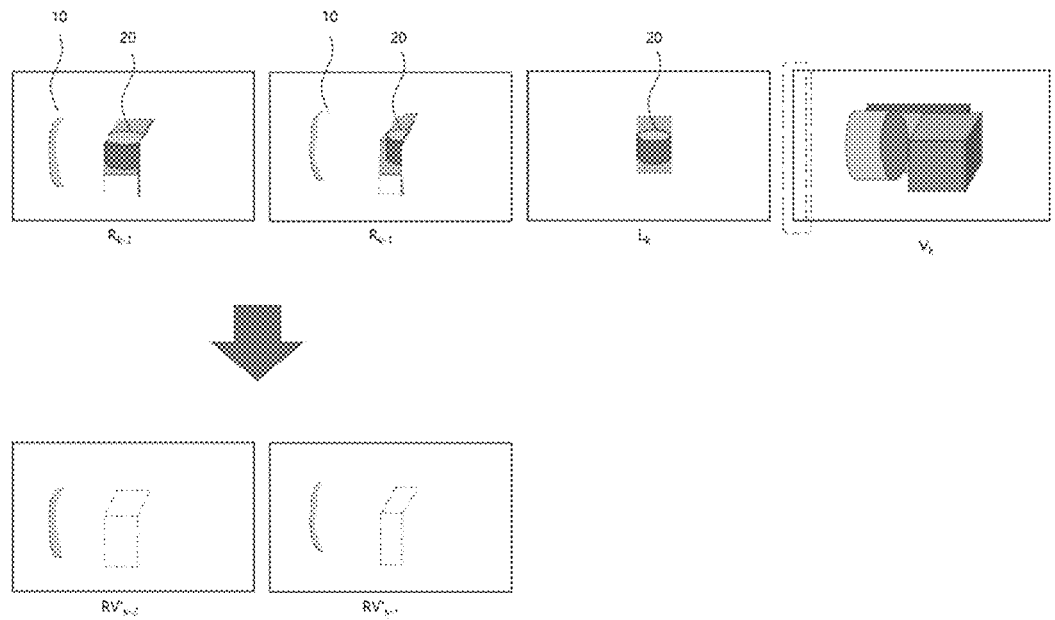
FIG. 12 illustrates an example of removing an overlapping region among additional view videos.
FIGS. 13A and 13B are views for explaining an extended layered video.

FIG. 12 illustrates an example of removing an overlapping region among additional view videos.

In the example illustrated in FIG. 12, a first reference video $R_{k-1}$, which is generated through 3D warping of a first residual video $RV_{k-1}$ for a first additional view $x_{k-1}$, includes data of an object 10 seen in a base view $x_k$ and data of an object 20 unseen in the base view $x_k$.

Likewise, a second reference video $R_{k-2}$, which is generated through 3D warping of a second residual video $RV_{k-2}$ for a second additional view $x_{k-2}$, includes data of an object 10 seen in a base view $x_k$ and data of an object 20 unseen in the base view $x_k$.

Based on a reference video $R_{k-1}$ and a reference video $R_{k-2}$, a layered video $L_k$ for a base view may be generated. For example, a layered video $L_k$ may be generated by merging data included in a reference video $R_{k-1}$ and a reference video $R_{k-2}$.

When a layered video is generated, duplicate data between a base view video and reference videos may be removed. For example, as illustrated in FIG. 12, a first reference video $R_{k-1}$ and a second reference video $R_{k-2}$ include data of an object 10 seen in a base view $x_k$.

In other words, when a first residual video $RV_{k-1}$ and a second residual video $RV_{k-2}$ are 3D-warped based on a base view $x_k$, data of an object 10 are projected in a same region as a base view video.

Thus, a layered video $L_k$ may be generated by removing data for an object 10 that is projected to a same region as a base view region. Consequently, a layered video may include data that are unseen in a base view $x_k$ (for example, data for an object for which the view is blocked).

A final residual video for an additional view may be generated by using a layered video (S1104). In other words, a layered video may be used as a reference video for generating residual data of an additional view video. Specifically, a final residual video for an additional view may be derived by removing duplicate data with a layered video from a residual video of an additional video.

For example, as illustrated in FIG. 10, a first residual video $RV_{k-1}$ may be generated by removing duplicate data between a first additional view video $V_{k-1}$ and a base view video $V_k$. Next, in the example illustrated in FIG. 12, when a layered video $L_k$ is generated based on a first residual video $RV_{k-1}$, a third residual video $RV'_{k-1}$ may be generated by removing duplicate data between the first residual video $RV_{k-1}$ and the layered video $L_k$. For example, as data for an object 20 are commonly included in a first residual video $RV_{k-1}$ and a layered video $L_k$, a third residual video $RV'_{k-1}$ may be generated by removing the data for the object 20 from the first residual video $RV_{k-1}$.

Likewise, in the example illustrated in FIG. 10, a second residual video $RV_{k-2}$ may be generated by removing duplicate data between a second additional view video $V_{k-2}$ and a base view video $V_k$. Next, in the example illustrated in FIG. 12, when a layered video $L_k$ is generated based on a second residual video $RV_{k-2}$, a fourth residual video $RV'_{k-2}$ may be generated by removing duplicate data between the second residual video $RV_{k-2}$ and the layered video $L_k$. For example, as data for an object 20 are commonly included in a second residual video $RV_{k-2}$ and a layered video $L_k$, a fourth residual video $RV'_{k-2}$ may be generated by removing the data for the object 20 from the second residual video $RV_{k-2}$.

In other words, a residual video of an additional view video may be obtained by removing duplicate data with a base view video and duplicate data with a layered video.

In FIG. 12, it is illustrated that there is one base view. However, when the number of additional view videos is larger than illustrated in FIG. 12 and each of the additional view videos faces a different view, a multiplicity of base views may be selected according to the structure of each camera. In case a multiplicity of base views is selected, a residual video for an additional view video may be obtained based on each base view video.

In this process, a base view video, a layered video and final residual videos for each of additional view videos may be generated.

An extended layered video may also be generated by adding a region, which is not seen in additional view videos, to a layered video. For example, an extended residual region including a region, which is unseen in additional view videos, may be generated, and an extended layered video may be generated by adding the extended residual region to a layered video.

Here, an extended residual region is a region that is unseen in every additional view. Data of an extended residual region may be generated by an image inpainting algorithm based on a time-axis reference method or generative adversarial networks.

Alternatively, an extended layered video may also be generated by setting differently the number of view videos used for generating the extended layered video and the number of view videos to be transmitted.

FIGS. 13A and 13B are views for explaining an extended layered video.

FIGS. 13A and 13B show a camera array. One of source view videos captured by each of a multiplicity of cameras with different views may be selected as a base view video. For example, as illustrated in FIG. 13A, a camera in the central position (2, 2) may be selected as a base view.

Residual videos for additional view videos may be generated by using a selected base view video, and a layered video for the base view video may be generated by using the generated residual videos.

For example, residual videos may be generated by removing duplicate data with a base view video from each of additional view videos captured by the remaining cameras except a camera in a central position. A layered video may be generated by 3D-warping residual videos thus generated to a coordinate system of a base view and by removing redundancy among residual videos.

In order to synthesize a view video in an immersive video output apparatus, a base view video, a layered video and residual data (for example, atlas video) for additional views may be transmitted.

Here, instead of transmitting residual data for all the additional views, residual data for only some necessary additional views may be transmitted. For example, as illustrated in FIG. 13B, only residual data of some additional views (0, 0), (2, 0), (4, 0), (0, 2), (4, 2), (0, 4), (2, 4) and (4, 4) may be transmitted to an immersive video output apparatus.

Thus, a layered video may include data that are unseen in additional views of which residual data are to be transmitted. In other words, an extended layered video may be generated by using more additional views than available additional views for video synthesis.

In order to reduce duplicate data among residual videos, videos may be divided into a multiplicity of groups. For example, additional view videos or residual videos may be classified into a multiplicity of groups and residual data may be extracted.

Specifically, additional view videos may be classified into a multiplicity of groups. For example, additional view videos, which are adjacent to each other, or additional view videos having much common data may belong to one group. Here, adjacent additional view videos may mean additional view videos with consecutive view numbers. For example, an additional view video with the view number k−1 and/or an additional view video with the view number k+1 may be set as a neighboring additional view video of an additional view video with the view number k.

An order of pruning priority may be set among additional view videos that belong to a particular group. Pruning of an additional view video with a lower priority may be performed based on a base view video and another additional view video with a higher priority than the additional view video. Residual data of an additional view video with a lower priority may be generated by removing duplicate data with a base view video and duplicate data with an additional view video with a higher priority.

An order of priority among additional view videos may be determined based on view numbers. For example, an order of pruning priority may be set in an ascending or descending order of view numbers. Alternatively, after detecting duplicate data among additional view videos or between an additional view video and a base view video, an order of pruning priority may be set in an ascending or descending order of the amount of detected duplicate data. Information on an order of pruning priority may be encoded as metadata.

Additional view videos, which belong to a different group from a specific additional view video, may not be used for pruning of the specific additional view video. In other words, quality enhancement may be expected during a synthesis process by excluding a low correlation case between a base view and an additional view or between additional views through grouping of additional view videos.

Alternatively, residual videos with much duplicate data may be classified into a multiplicity of groups. Then, a common residual video for residual videos belonging to one group may be generated. Residual data of an additional view video may be obtained by removing duplicate data with a base view video and duplicate data with a common residual video.

Figure 14:
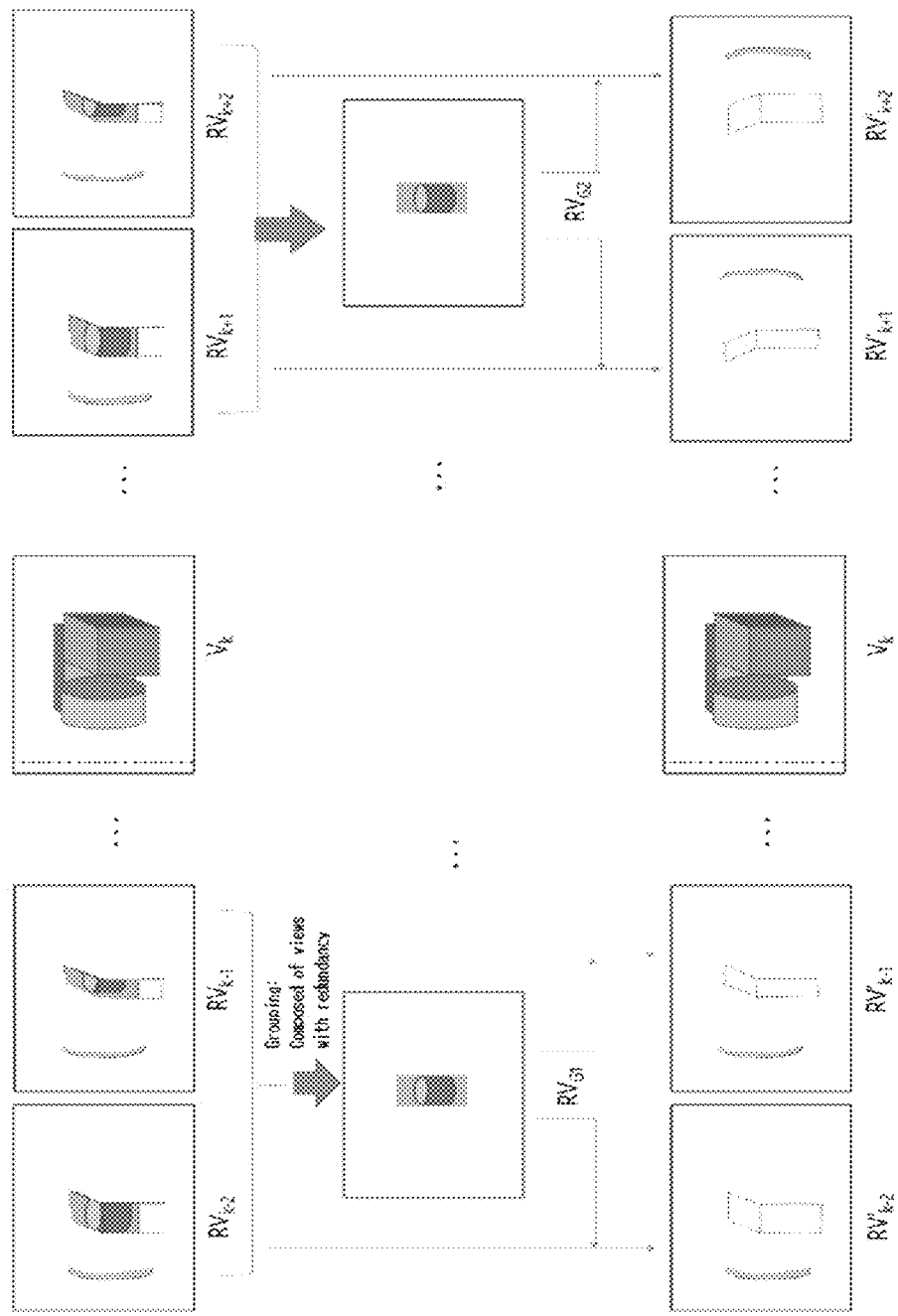
FIG. 14 is a view illustrating an example of generating a common residual video.

FIG. 14 is a view illustrating an example of generating a common residual video.

Additional view videos, which are adjacent to each other, or additional view videos having much common data may be classified into one group. For example, as illustrated in FIG. 14, a first additional view video $V_{k-1}$ and a second additional view video $V_{k-2}$ may be classified into a first group, and a third additional view video $V_{k+1}$ and a fourth additional view video $V_{k+2}$ may be classified into a second group.

A first global residual video $RV_{G1}$ may be generated based on a first residual video $RV_{k-1}$ of a first additional view video $V_{k-1}$ and a second residual video $RV_{k-2}$ of a second additional view video $V_{k-2}$ in a first group. A second global residual video $RV_{G2}$ may be generated based on a third residual video $RV_{k+1}$ of a third additional view video $V_{k+1}$ and a fourth residual video $RV_{k+2}$ of a fourth additional view video $V_{k+2}$ in a second group.

A global residual video may be generated by merging/synthesizing residual videos belonging to a corresponding group. When a global residual view is generated, duplicate data between a residual video and a base view video may be removed. For example, a first global residual video $RV_{G1}$ may not include duplicate data between a first residual video $RV_{k-1}$ and a base view video $V_k$ and/or duplicate data between a second residual video $RV_{k-2}$ and a base view video $V_k$.

A final residual video of an additional view video belonging to a specific group may be generated by removing duplicate data with a global residual video for the specific group.

For example, an updated first residual video $RV'_{k-1}$ may be generated by removing duplicate data with a first global residual video $RV_{G1}$ from a first residual video $RV_{k-1}$. An updated first residual video may be used as a final residual video for an additional view $x_{k-1}$.

In addition, an updated second residual video $RV'_{k-2}$ may be generated by removing duplicate data with a first global residual video $RV_{G1}$ from a second residual video $RV_{k-2}$. An updated second residual video $RV'_{k-2}$ may be used as a final residual video for an additional view $x_{k-2}$.

An updated third residual video $RV'_{k-3}$ may be generated by removing duplicate data with a second global residual video $RV_{G2}$ from a third residual video $RV_{k-3}$. An updated third residual video may be used as a final residual video for an additional view $x_{k-3}$.

In addition, an updated fourth residual video $RV'_{k-4}$ may be generated by removing duplicate data with a second global residual video $RV_{G2}$ from a fourth residual video $RV_{k-4}$. An updated fourth residual video may be used as a final residual video for an additional view $x_{k-4}$.

In this process, a base view video, a global residual video for each group, and final residual videos for each of additional view videos may be generated.

In the example illustrated in FIG. 14, the number of groups is 2. The number of groups may be set to 1. Alternatively, the number of groups may be set to 2 and above.

Each group may include the same number of additional view videos. For example, the number of additional view videos included by each group may be 2, 3, 4 or above.

Alternatively, the number of additional view videos included in any one group may be different from the number of additional view videos included in another group. It is also possible to set one view video as one group.

Based on view numbers, additional view videos may be grouped. For example, additional view videos with a higher view number than a base view video may be set to belong to a different group from other additional view videos with a lower view number than the base view video.

Information on a global residual video may be encoded as metadata. Here, information on a global residual video may include at least one among information on mapping relationship between the global residual video and an additional view, information indicating the number of residual videos constituting the global residual video, and information on an additional view covered by the global residual video.

Data included in residual videos may be processed into square patches, and patches extracted from a multiplicity of residual videos may be packed into an atlas video. Here, data included in a layered video or a global residual video may also be packed into an atlas video. Alternatively, a layered video or a global residual video may be independently encoded/decoded.

An encoding/decoding load may be reduced by gathering data included by residual videos into a single video.

A packing method for residual data will be described in detail.

In a 3D-geometric relationship, video transformation may be performed based on Euclidean transformation and/or Similarity transformation. Euclidean transformation includes horizontal and vertical translations and rotations in a 3D coordinate system. Here, a homogeneous coordinate system requires 6DoF.

Similarity transformation adds scaling to the Euclidean transformation, thereby demanding 7DoF.

In case the above-described concepts of transformation are applied to packing, since packing is performed on a two-dimensional video, transformation of residual data may be expressed by 3DoF or 4DoF.

Figure 15:
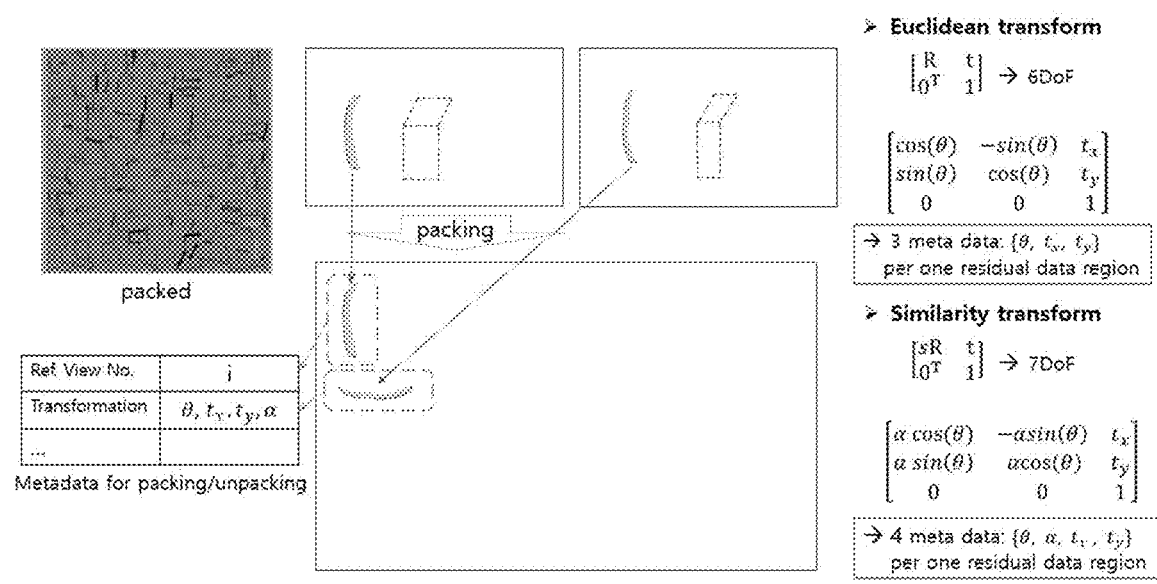
FIG. 15 is an example showing a packing aspect of residual data.

FIG. 15 is an example showing a packing aspect of residual data.

If it is assumed that no scaling is considered for patch packing, transformation of a patch may be expressed based on a rotation angle θ, horizontal translation t_x and vertical translation t_x, which correspond to 3DoF. Accordingly, transformation information including rotation angle, horizontal translation and vertical translation in each patch may be encoded as metadata.

If it is assumed that scaling is considered for patch packing, transformation of a patch may be expressed based on a rotation angle θ, horizontal translation t_x, vertical translation t_x and scaling factor α, which correspond to 4DoF. Accordingly, transformation information including rotation angle, horizontal translation, vertical translation and scaling factor in each patch may be encoded as metadata.

Horizontal translation information and vertical translation information may be constructed by including a patch position within an additional view video (or residual video) and a patch position within an atlas video.

Table 1 presents a syntax table including metadata related to patches.

TABLE 1

| patch_data_unit( patchIdx) { | Descriptor |
| --- | --- |
| patch_2d_pos_x[ patchIdx ] | u(v) |
| patch_2d_pos_y[ patchIdx ] | u(v) |
| patch_2d_delta_size_x[ patchIdx ] | se(v) |
| patch_2d_delta_size_y[ patchIdx ] | se(v) |
| patch_view_pos_x[ patchIdx ] | u(v) |
| patch_view_pos_y[ patchIdx ] | u(v) |
| patch_view_id[ patchIdx ] | u(v) |
| patch_orientation_index[ patchIdx ] | u(v) |
| patch_scale_x_minus1[ patchIndex ] | ue(v) |
| patch_scale_y[ patchIndex ] | ue(v) |

In Table 1, patchIdx represents an index for identifying each patch.

The syntax patch_2d_pos_x and the syntax patch_2d_pos_y represent positions of patches within an atlas video.

The syntax patch_2d_delta_size_x and the syntax patch_2d_delta_size_y represent patch sizes. For example, the syntaxes may represent a size difference from a previous patch.

The syntax patch_view_pos_x and the syntax patch_view_pos_y represent positions of patches within a source view video. When the syntax patch_2d_pos_x and the syntax patch_view_pos_x have different values, it means that a patch is moved horizontally during patch packing. When the syntax patch_2d_pos_y and the syntax patch_view_pos_y have different values, it means that a patch is moved vertically during patch packing.

The syntax patch_view_id specifies a source view video (or a source view) that is a source of a patch.

The syntax patch_orientation_idx represents whether or not a patch is rotated during patch packing. The syntax patch_orientation_idx may indicate one of rotation candidates, and the rotation candidates may include at least one among 90-degree rotation, 180-degree rotation, −90-degree rotation, left/right flip and up/down flip.

Based on the syntaxes patch_scale_x_minus1 and patch_scale_y_, it may be determined whether or not a patch is scaled during patch packing. The syntax patch_scale_x_minus1 may be used to determine a scaling factor for a vertical direction, and the syntax patch_scale_y may be used to determine a scaling factor for a vertical direction.

Hereinafter, a method of generating a viewport video using an atlas video will be described in detail.

Figure 16:
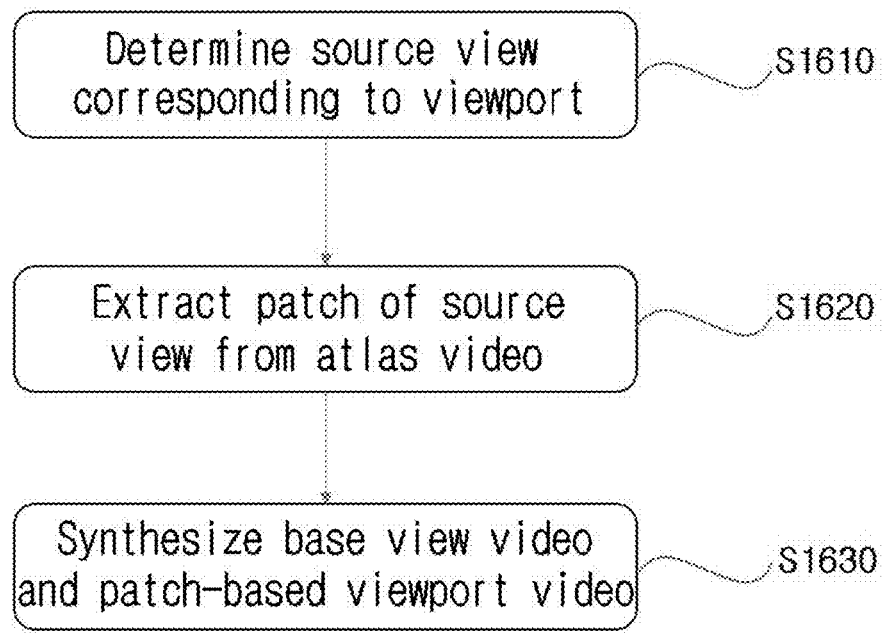
FIG. 16 is a flowchart illustrating a process of synthesizing a viewport video.

FIG. 16 is a flowchart illustrating a process of synthesizing a viewport video.

When a viewing position of a user is input, at least one source view necessary for generating a viewport video suitable for the viewing position of a user may be determined (S1610). For example, when a viewport is located between a first view $x_1$ and a second view $x_2$, the first view $x_1$ and the second view $x_2$ may be determined as source views for viewport video synthesis.

When a source view thus determined is a shared view, a reference additional view of the share view may also be determined as a source view for viewport video synthesis.

A metadata processor 230 may determine at least one base view corresponding to a viewing position of a user and at least one of an additional view or a share view by analyzing metadata.

When a source view is determined, it is possible to extract residual data that are derived from a source view determined based on an atlas video (S1620). Specifically, after a source view of patches in an atlas video is confirmed, patches that are source views, of which a source is determined, may be extracted from the atlas video.

When residual data are extracted, a viewport video may be synthesized based on the extracted residual data and a base view video (S1630). Specifically, a viewport video may be generated by warping a base view video and a residual video to a coordinate system of a viewing position and adding the warped reference videos. Here, a position/size of residual data (for example, patch) may be parsed in metadata.

Figure 17:
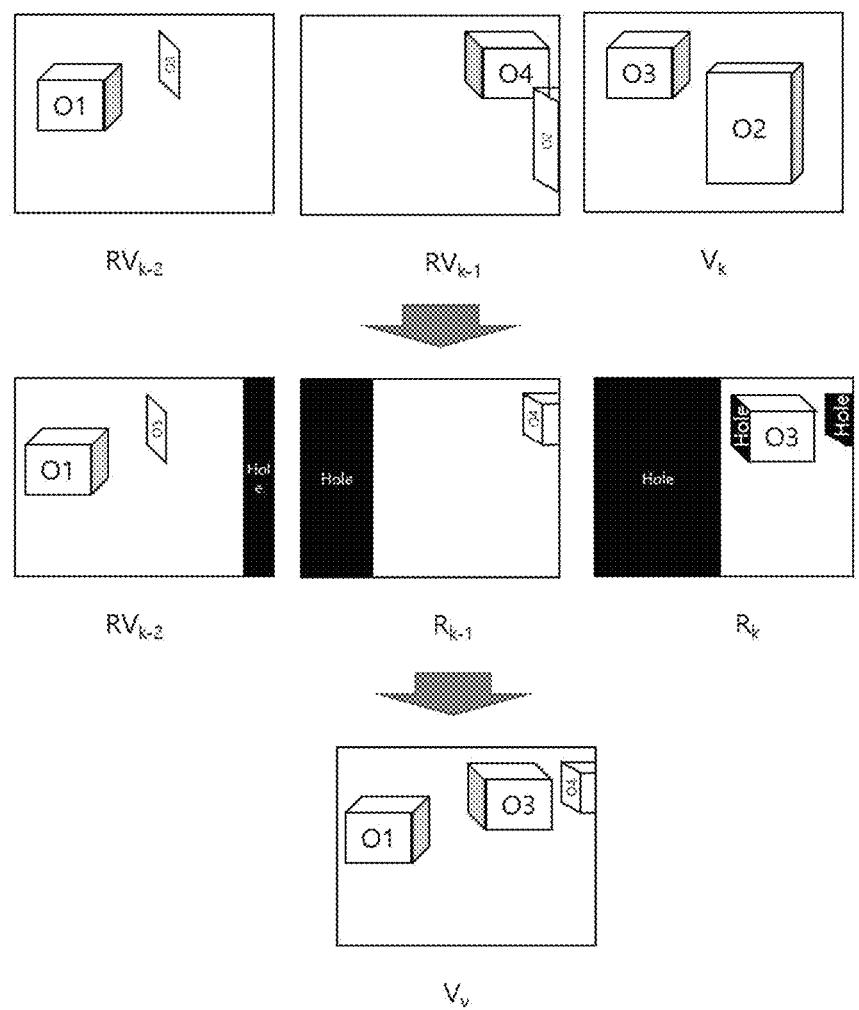
FIG. 17 is a view illustrating an example of synthesizing a viewport video by using a base view video and patches.

FIG. 17 is a view illustrating an example of synthesizing a viewport video by using a base view video and patches.

A viewport video $V_v$ corresponding to a viewing position $x_v$ of a user may be generated by synthesizing a base view video $V_k$, a residual video $RV_{k-1}$ for a reference view video $V_{k-1}$, a residual video $RV_{k-2}$ for an additional view video $V_{k-2}$.

First, a reference video $R_k$ may be generated by warping a base view video $V_k$ to the coordinate system of an additional view $x_v$. An object O3 in a reference video $R_k$ is mapped as its position is determined according to depth. Although an object O2 is also mapped according to the coordinate system of a view $x_{k-2}$, since it is not included in a viewport (that is, a view $x_v$), it is not included in a viewport video $V_v$.

Next, a texture of a region that is unseen in a base view video $V_k$ but seen in a view $x_v$ should be generated. For this, with reference to a three-dimensional geometric relationship, a suitable view for bringing a texture, which is left as a hole in a reference video $R_k$, through backward warping, is determined. In FIG. 17, a view $x_{k-1}$ and a view $x_{K-2}$ are illustrated as reference views for backward warping.

Information of patches is extracted from metadata, and patches derived from a view $x_{k-1}$ and a view $x_{k-2}$ are extracted based on the extracted information. When patches are extracted, the extracted patches are warped to a view $v_x$. For example, a reference view $R_{k-1}$ and a reference video $R_{k-2}$ are generated by warping a residual video $RV_{k-1}$ of a view $x_{k-1}$ and a residual video $RV_{k-2}$ of a view $x_{k-2}$ according to the coordinate system of a view $x_v$. Then, data to be inserted into a texture that is left as a hole in a reference video $R_k$ are extracted from data included in a reference video $R_{k-1}$ and a reference video $R_{k-2}$.

For example, data for an object O4, which is left as a hole in a reference video $R_k$, may be extracted from a reference video $R_{k-1}$, and data for the left side of an object O3, which is left as a hole, and data for an object O1, which is left as a hole, may be extracted from a reference video $R_{k-2}$.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The above-described embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. An immersive video processing method comprising:
classifying a multiplicity of views into a base view and an additional view;
generating a residual image for a first additional view image which corresponds to a first view classified as the additional view;
packing patches, which are generated based on the residual image, into an atlas;
and generating metadata for the patches,
wherein the residual image for the first additional view image is generated through pruning with a second additional view image that corresponds to a second view classified as the additional view, and
wherein the second view is included in a same group as the first view and has a higher priority than the first view.

2. The method of claim 1, wherein the metadata comprises transformation information for a patch, and
wherein the transformation information comprises information of horizontal translation, information of vertical translation and information of rotation for the patch.

3. The method of claim 2, wherein the transformation information further comprises scaling information of the patch.

4. The method of claim 1, wherein the method further comprises generating extended data that is hidden from at least one view.

5. The method of claim 4,
wherein the extended data is generated by inpainting a region hidden from the at least one view.

6. The method of claim 4, wherein the extended data is packed into the atlas as a patch, and
wherein the metadata comprises scaling information for the patch corresponding to the extended data.

7. The method of claim 1, wherein the residual view for the first additional image is generated by sequentially pruning with a base view image and the second additional view image.

* * * * *